United States Patent [19]

Hildreth

[11] Patent Number: 4,498,704
[45] Date of Patent: Feb. 12, 1985

[54] HEADREST FOR CHAIR WITH SOFT BACKREST

[76] Inventor: Joseph R. Hildreth, 5015 Old Cheney Hwy., Orlando, Fla. 32807

[21] Appl. No.: 389,215

[22] Filed: Jun. 17, 1982

[51] Int. Cl.³ .............................................. A47C 7/36
[52] U.S. Cl. .................................... 297/397; 297/400
[58] Field of Search ............... 297/410, 400, 399, 397, 297/391, 401, 402

[56] References Cited

U.S. PATENT DOCUMENTS

| | | | |
|---|---|---|---|
| 48,586 | 7/1865 | Phelps | 297/401 |
| 217,169 | 7/1879 | Taylor | 297/399 |
| 856,025 | 6/1907 | Brown | 297/400 |
| 1,565,730 | 12/1925 | Gilmour | 297/399 |
| 2,624,397 | 1/1953 | St. Aubin | 297/400 |
| 3,226,159 | 12/1965 | Binding | 297/410 |
| 4,030,781 | 6/1977 | Howard | 297/410 |

*Primary Examiner*—Francis K. Zugel
*Attorney, Agent, or Firm*—Julian C. Renfro

[57] ABSTRACT

A headrest device particularly adapted for removable installation upon the non-rigid backrest of a chair or wheelchair, comprising a first elongate member of generally U-shaped configuration, upon the upper part of its arms, a pillow-like head-contacting member is supported. A second elongate member resides in a plane generally parallel to and spaced from the plane of the first member, and means are provided on the upper ends of the arms of the second member for slidable attachment to the arms of the first member. The spaced-apart relation of the first and second members permits the backrest of a chair or wheelchair to be received therebetween. Finger operated locking means may be provided for securing the arms of the second member to the arms of the first member such that undesired movement of the head-contacting member away from a selected position on the backrest of the chair or wheelchair can be prevented. I preferably provide some curvature in the arms of the first elongate member, to add to the comfort of the occupant of the chair or wheelchair.

4 Claims, 4 Drawing Figures

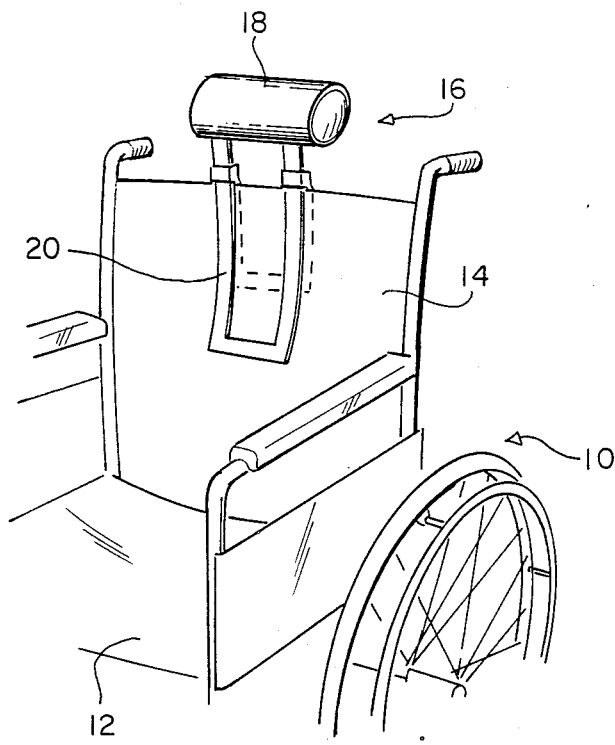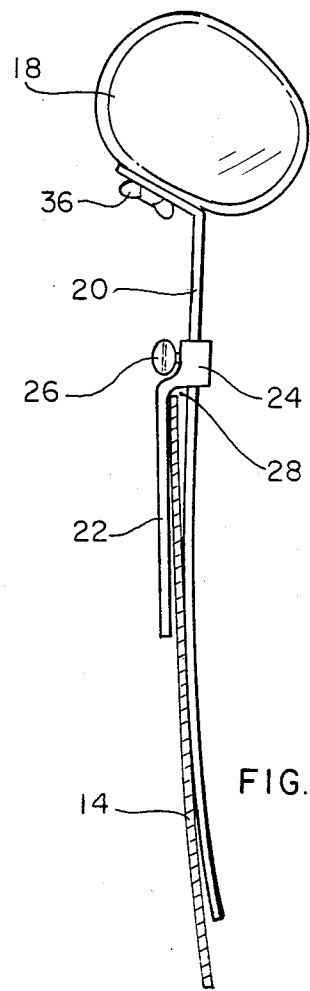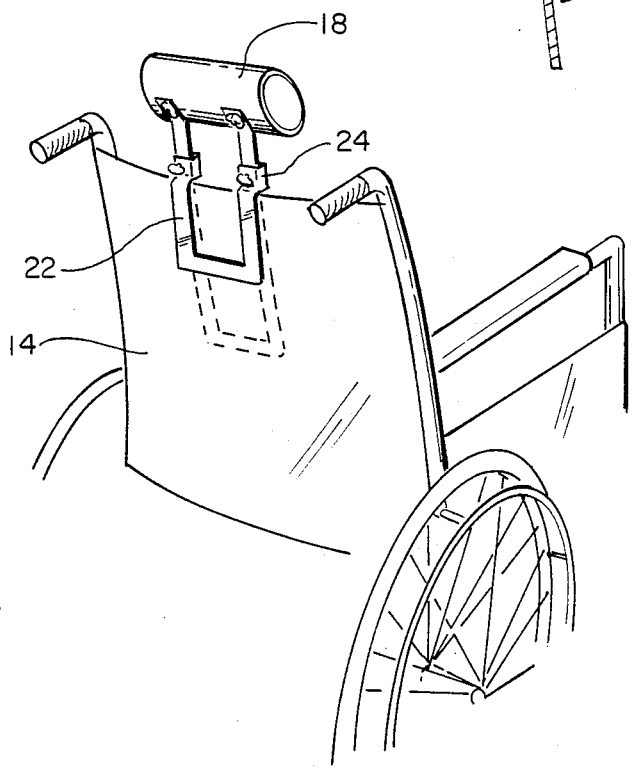
FIG. 1
FIG. 3
FIG. 2

HEADREST FOR CHAIR WITH SOFT BACKREST

BACKGROUND

In the past, a number of adjustable headrests have been utilized on the back of seats, such as automobile seats, lawn chairs, wheelchairs and the like, provided for the comfort and/or safety of the occupant. Some of these headrests have been relatively permanently affixed to the seat backs, whereas others have been removable therefrom when the period of their use has been completed.

Those headrests removable from the seat back have typically been supported either from a relatively stiff seat back, or else from the frame of the chair, and have been relatively heavy as well as expensive.

People required to spend a considerable part of their lifetime in a wheelchair often experience particular discomfort, and various support means may be provided on the wheelchair. A particular example is the U.S. Pat. No. 3,189,385, to Mommsen wherein means are shown such that a leg can be supported in a raised position.

Persons suffering from certain forms of arthritis, cancer, or from neck injury often are in particular need of head supports for their wheelchairs, and the patent to Lane, U.S. Pat. No. 3,730,589 is illustrative of a device designed to provide head or back support. However, a support device of that type is necessarily expensive, for it needs to have several adjustable portions, and effective locking means are utilized in three, four, or more locations to prevent slippage away from a selected position.

Perhaps even more disadvantageous is the fact that a wheelchair equipped with structural components of the type taught by Lane and others cannot be readily folded or collapsed, as is usually necessary in the instance it is desired to take the patient and his or her wheelchair for an automobile trip, or in a public conveyance.

Other known head support devices for wheelchairs have involved components designed to be inserted into the rearwardly-extending tubular handles of wheelchairs, in order for such headrest devices to be maintained in an effective position. Examples of the latter are the Montagano U.S. Pat. No. 3,674,310 and the East U.S. Pat. No. 4,227,740, but as can be readily seen from an inspection of such devices, the utilization of components in the wheelchair handles makes it exceedingly difficult for a nurse, friend or family member to push the wheelchair and its occupant from place to place. Additionally, it is important for the tubular handles of the wheelchair to be substantially parallel, and to be moved apart for a precise distance before the head support devices can be inserted into the handles.

It was to overcome the disadvantages of these and other such head support devices of the prior art that the present invention was evolved.

SUMMARY OF INVENTION

In accordance with the present invention, I have provided a light weight but nevertheless very effective headrest arrangement for use with chairs or wheelchairs that have a non-rigid backrest portion. In a preferred embodiment, I utilize a pair of interconnected frames or members each of essentially U-shaped configuration, with the plane of the second frame or member being spaced a short distance away from the plane of the first frame or member, so as to create a slot or space between the members. This slot is arranged to receive the fabric seatback or backrest portion of a chair or wheelchair, and because of the advantageous construction of my novel device, the non-rigid seatback can be caused to provide adequate support for the head-contacting member provided atop the arms of the first U-shaped member.

Advantageously, the second elongate member can be slid along the first member for a considerable distance, and thus form a height adjustment means for the soft, pillow-like head-contacting portion of my novel device. Tightening means such as thumb bolts can be provided so that the second member can be locked in a selected position on the first member.

Although the first member is arranged to reside on the side of the backrest nearest the chair occupant, it does not cause discomfort, for the arms of the first member are spaced far enough apart as to be out of contact with the spinal column of the occupant. It is most important to note that by proper design and adjustment, my novel headrest device will not be dislodged from its proper position on the seatback, even when the chair occupant leans forward. As a matter of fact, the headrest will remain in place whether the occupant is in the chair or not.

Because my headrest is of relatively simple construction, it can be produced cheaply, and yet provide many years of maintenance-free service. No tools are necessary to effect needed adjustments, and once it has been adjusted for a given patient, my device can quickly be installed in a proper operative position on any standard wheelchair.

A principal object of my invention is therefore to provide a headrest device that can be readily and satisfactorily accommodated upon a non-rigid backrest of a chair or wheelchair.

Another object of my invention is to provide a low-cost yet comfortable headrest device that can be easily added to or removed from the soft, non-rigid backrest of a wheelchair, such as of a foldable type.

Yet another object of my invention is to provide a light weight, inexpensive and uncomplicated headrest that requires the use of no tools in order for it to be quickly and easily added to or removed from the backrest of a wheelchair, even by an aged or infirm patient.

Still another object is to provide a headrest requiring no bolts, screws, straps or wires in order for it to be maintained in a proper functional position on the back of a chair or wheelchair, including a laterally foldable wheelchair.

These and other objects, features and advantages will become more apparent as the description proceeds.

BRIEF DESCRIPTION OF DRAWINGS

FIG. 1 is a fragmentary perspective view taken from the front of a wheelchair equipped with a novel headrest assembly in accordance with my invention;

FIG. 2 is a fragmentary perspective view taken from the rear of a wheelchair equipped with a headrest in accordance with my invention;

FIG. 3 is a side view to an enlarged scale, illustrating how the front and rear principal members of my novel headrest are spaced apart such that the soft seatback of a wheelchair can be straddled.

DETAILED DESCRIPTION

Figure 4:
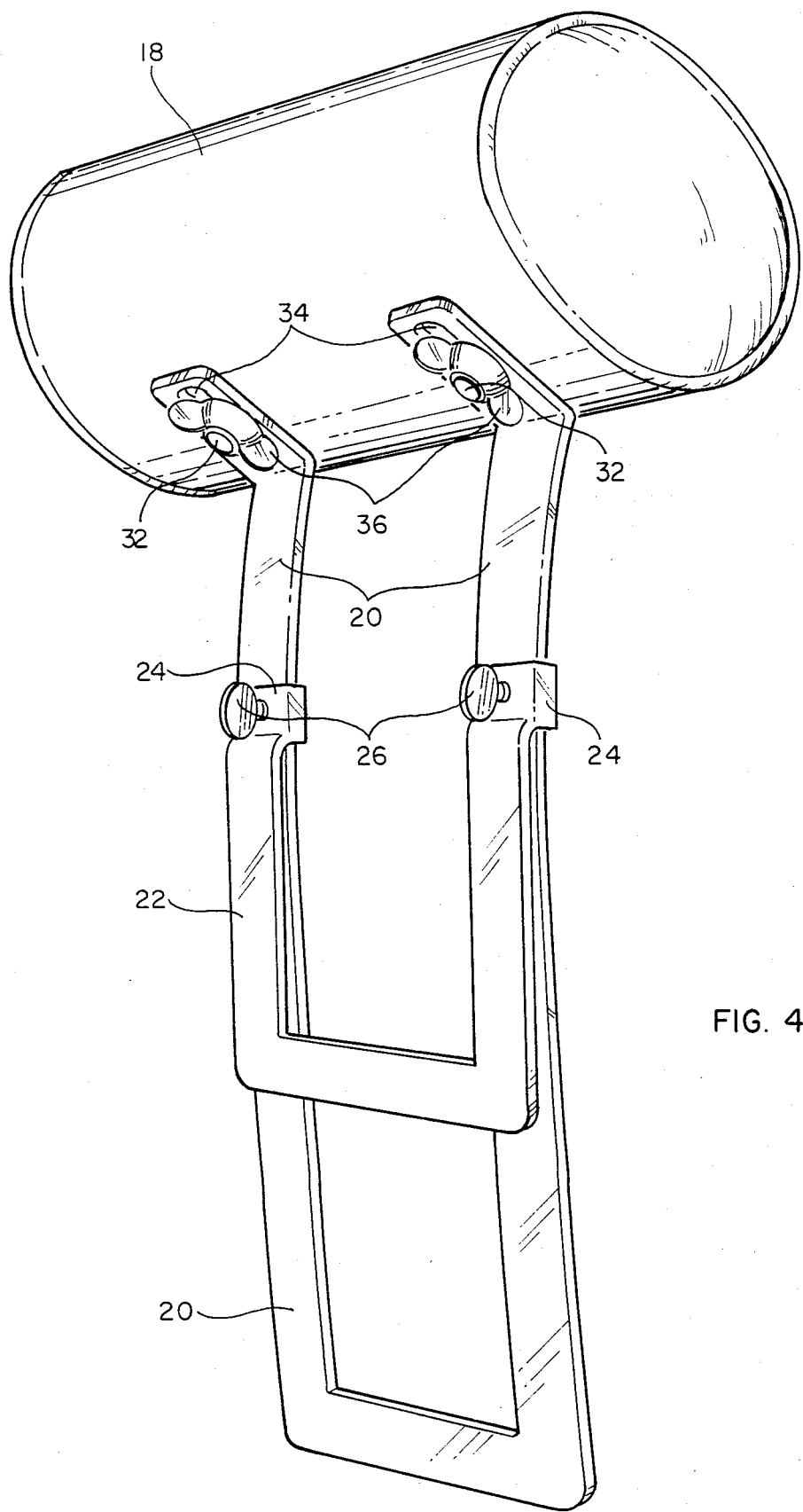
FIG. 4 is a perspective view to a substantially enlarged scale of my novel headrest assembly, with this view closely revealing the height adjustment means as well as the means for adjusting the position of the head-

Turning to FIG. 1, it will there be seen that I have shown a fragmentary upper portion of a wheelchair 10 having a seat portion 12 and a backrest portion 14. Supported upon the portion 14 is a headrest device 16 in accordance with this invention, the details of which will shortly be discussed.

It is important to note that my novel headrest device can be accommodated upon a wide range of seatbacks, even when the seatbacks are of non-rigid construction. Wheelchairs of a folding type typically have seats and seatbacks made of a plastic coated fabric or the like so that no substantial resistance will be encountered when the left and right sides of the wheelchair frame are moved together during the folding of the wheelchair. An example of a laterally folding wheelchair is shown in the Leslie et al U.S. Pat. No. 2,621,711. Even though such a seatback or backrest is strong in tension, so as to readily support the weight of a person leaning back in the wheelchair, this type of seatback is non-rigid, and it is therefore not readily apparent that such a seatback can satisfactorily support a headrest that can add a substantial measure of comfort for the patient.

As can be seen from my FIGS. 1 and 2, and in more detail in FIG. 3, the soft, pillow-like portion 18 of my headrest device is supported from an elongate frame 20 of generally U-shaped configuration. Quite importantly, the frame 20, also known as the first member, is relatively flat so as not to cause discomfort to a wheelchair occupant as he or she leans back against it. In other words, the components of the frame 20 are comparatively wide in the plane of the seatback, but made of material that is comparatively thin. For example, the material of which the arms of U-shaped member 20 are made can be stainless steel strips or bars $\frac{3}{4}''$ wide and $\frac{1}{8}''$ thick, or aluminum bars or strips 1'' wide and 3/16'' thick. The base member interconnecting the arms would in each instance typically be of the same thickness as the arms. Obviously I am not to be limited to the foregoing, for the width and thickness could differ widely from these preferred dimensions. Also, the frame 20 could be made of a different metal, or it even could be made of a non-metallic material, such as fibreglass.

As will be noted from the figures of drawing, the arms of the elongate U-shaped frame 20 are of substantial length, and slidably mounted upon these arms are the arms of an elongate frame or member 22 of smaller size, which I may hereinafter call the second member. Collars 24 are provided at the upper ends of frame or member 22 that encircle the arms of the frame or member 20. A locking means such as a thumb screw 26 is installed in each collar so as to enable a particular adjustment of the second member 22 with respect to the first member to be maintained. The member 22 is preferably U-shaped, but I am not to be limited to this configuration.

As will be noted from FIG. 3, the frame 22 (second member) is deliberately spaced away from frame 20 (first member) for approximately $\frac{1}{2}$ inch. In other words, the plane of the second member is spaced from the plane of the first member so as to create a relatively narrow slot 28. This arrangement makes it a relatively simple matter to slide the headrest assembly over the backrest portion of a chair or wheelchair. Because of the relatively narrow slot between the frames 20 and 22, a substantial amount of rigidity is in effect added to the seatback. FIG. 3 reveals the fact that the upper inside portions of the arms of member 22 possess curvature, and actually contact the upper edge of the seatback.

Also to be noted is the comparatively wide spacing of the arms of first member 20, and a similar wide spacing of the arms of second member 22. This arrangement also adds to the stability of my device as it resides upon the backrest of a seat. In an exemplary version of my headrest device, the first and second members each had an overall width of approximately $5\frac{1}{2}$ inches, and the arms of member 20 were approximately 18 inches long, including the bent-over upper ends of the arms.

For the additional comfort of the chair occupant, I provide slotted holes 34 in the upper ends of the arms of U-shaped member 20, as best seen in FIG. 4. Lugs 32 protrude from the head-contacting member 18, with the spacing of these lugs coinciding with the spacing of the slots 34. After the head-contacting member 18 has been properly adjusted in a plane substantially orthogonal to the plane of the first member 20, the thumb nuts 36 are tightened to secure the lugs and therefore the member 18 in a position with respect to frame or member 20 that is comfortable for the wheelchair occupant.

Although the elongate, generally U-shaped member 20 has been described as being in a plane spaced slightly away from the plane of member 22, I may prefer for the arms of member 20 to possess a slight amount of out-of-plane curvature, to add to the comfort of the wheelchair occupant. As viewed in FIG. 3, the mid portion of the arms of member 20 may be bent approximately $\frac{1}{2}$ inch out of the plane of the upper and lower portions of these arms. In other words, the lower portions of the arms of U-shaped member 20 and the base portion connecting the arms may be regarded as residing slightly further away from the plane of second member 22, than do the upper and mid portions of these arms. This curvature of the arms of member 20 causes the presence of this member to be less noticeable to the wheelchair occupant, for this amount of curvature essentially coincides with the amount of natural curvature of the spine of the typical occupant, as he or she sits in a wheelchair. Another reason for preferring some curvature in the arms of the member 20 is that the head-contacting member 18 remains more nearly equidistant from the head of the occupant of the wheelchair during the vertical adjustment of the headrest. This is because the seatback of the typical wheelchair is angled somewhat rearwardly, and the head-contacting portion, if carried by a first member having straight arms, would otherwise tend to move further away in the rearward direction from the wheelchair occupant's head as the member 20 is raised with respect to the member 22 and the seatback 14.

As should now be apparent, a headrest device constructed in accordance with this invention may readily be inserted on, or removed from, the backrest of a chair or wheelchair, with no clamps, screws or wires being necessary for maintaining the device in a selected operative position.

I claim:

1. A headrest device particularly adapted for removable installation upon a non-rigid backrest of a chair or wheelchair, comprising a first elongate member of generally U-shaped configuration, a pillow-like head-contacting member mounted upon the upper end of said first member, a second generally U-shaped member residing in a plane generally parallel to the plane of said first member, means provided on said second member for slidable attachment to portions of said first member, with said second member being slidable in order that a height adjustment for said head-contacting member can be achieved, a major portion of said second member being spaced close to said first member so as to define a relatively narrow slot between said members, into which slot the fabric backrest portion of a chair or wheelchair can be received, with the length of said first member and said second member being such that they extend down along opposite sides of a backrest portion of the chair or wheelchair for a sufficient distance as to provide a stable mounting for said head-contacting member, said first and second members each having a comparatively wide lateral spacing for stability reasons, and said first member possessing a slight degree of out-of-plane curvature in order to essentially coincide with the natural curvature of the spine of the occupant of the chair or wheelchair, said head-contacting member being adjustably mounted upon said first member, so that adjustments of said head-contacting member in a direction substantially perpendicualr to the plane of said first member can be accomplished.

2. The headrest device as defined in claim 1 in which finger-operated locking means are provided in the said means for slidable attachment of said second member to said first member, such that undesired movement of said head-contacting member away from a selected position can be prevented.

3. A headrest device particularly adapted for removable installation upon a non-rigid backrest of a chair or wheelchair, comprising a first elongate member of generally U-shaped configuration, a pillow-like head-contacting member mounted upon the upper ends of the arms of said first U-shaped member, a second elongate generally U-shaped member residing in a plane parallel to the plane of said first member, means provided at the top of said second member for slidable attachment to the arms of said first member, with said second member being slidable along the arms of said first member in order that a height adjustment for said head-contacting member can be achieved, the major portion of said second member being spaced close to said first member so as to define a narrow slot between said members, into which slot the fabric backrest portion of a chair or wheelchair can be received, with the length of the arms of said first member and said second member being such that they extend down along the backrest portion of the chair or wheelchair for a sufficient distance as to provide a stable mounting for said head-contacting member, said head-contacting member being adjustably mounted upon the arms of said first member so that adjustments of said head-contacting member in a direction substantially perpendicular to the plane of said first member can be accomplished, the arms of said first elongate member possessing a slight degree of curvature such that the lower portion of said first elongate member has moved slightly away from a planar relationship with said second member, such curvature adding to the comfort of an occupant of the chair or wheelchair.

4. The headrest device as defined in claim 3 in which finger-operated locking means are provided in the means slidably attaching said second member to the arms of said first member, such that undesired movement of said head-contacting member away from a selected position can be prevented.

* * * * *